Figure 16:
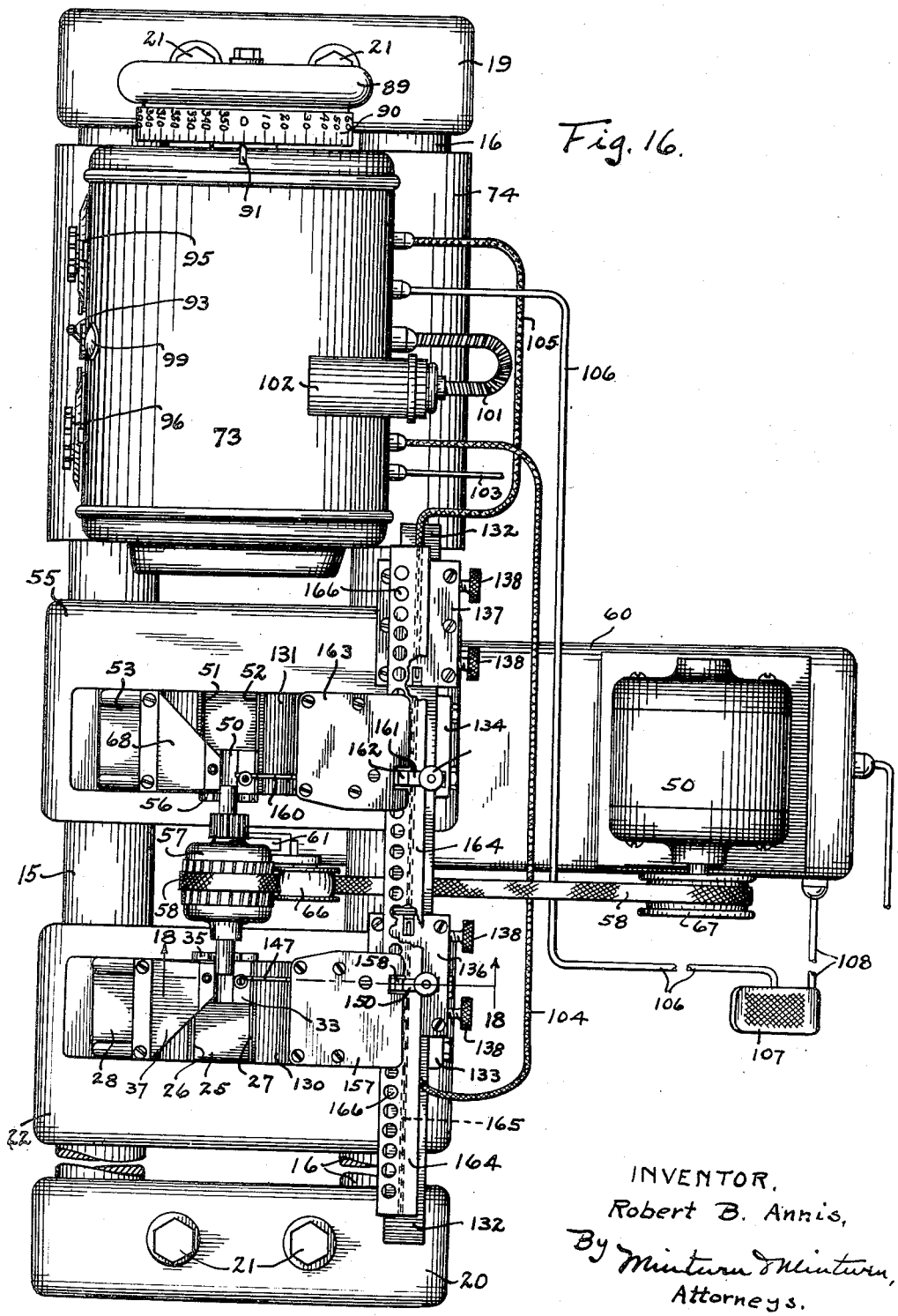

Aug. 14, 1945.   R. B. ANNIS   2,382,843
ELECTRONIC TYPE BALANCER
Filed March 25, 1943   9 Sheets-Sheet 1
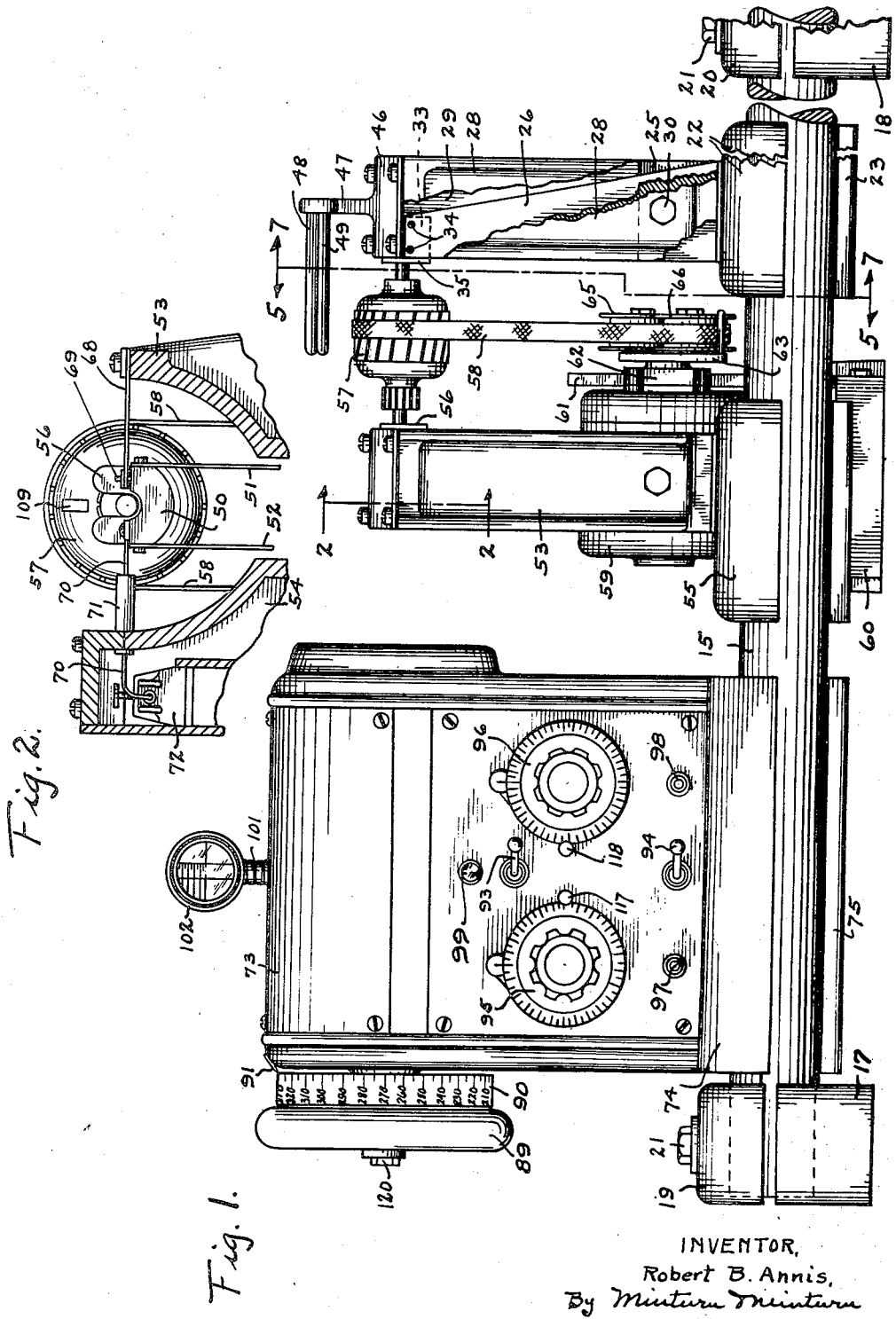
INVENTOR.
Robert B. Annis,
By Minturn Minturn
Attorneys.

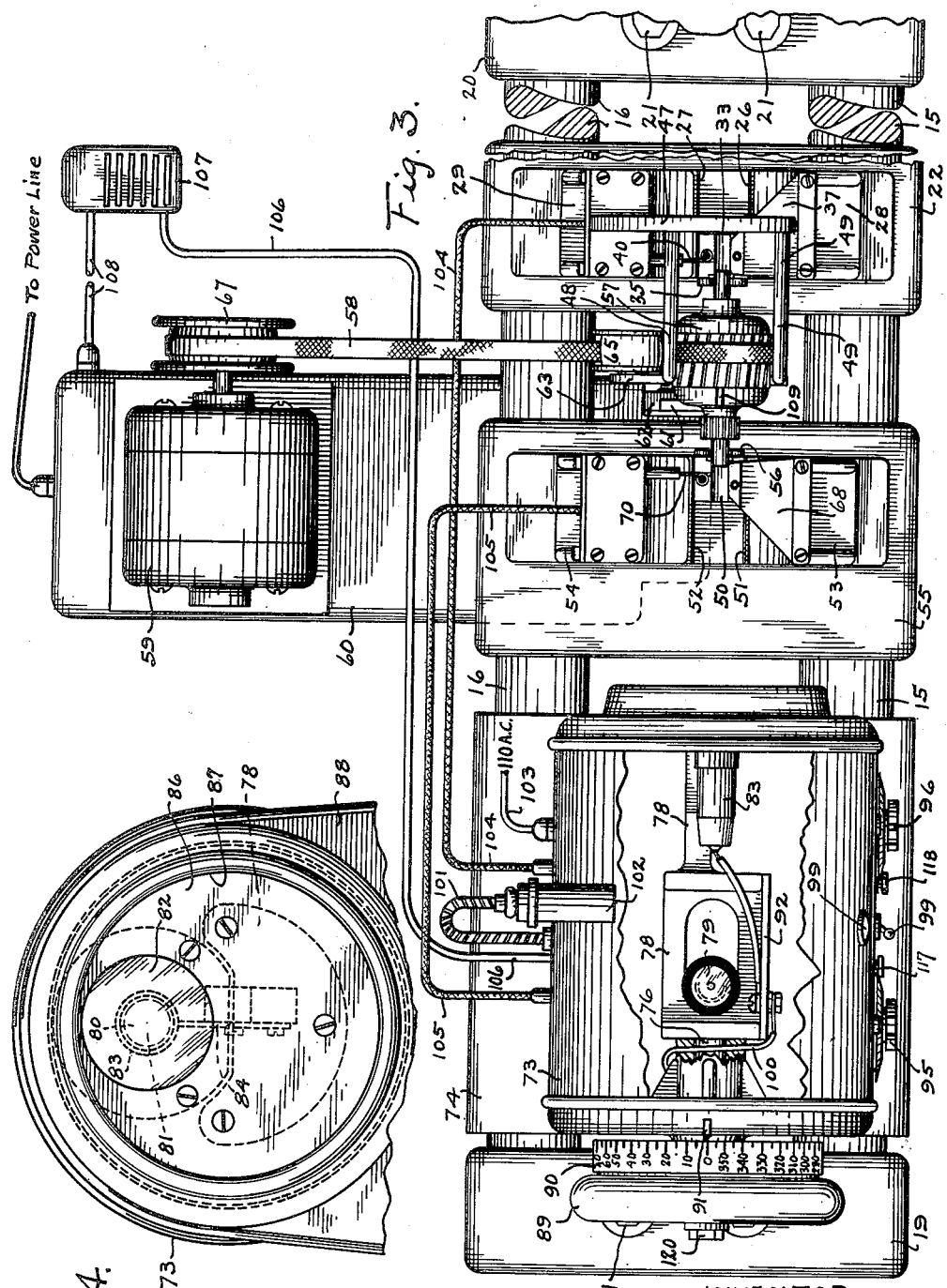

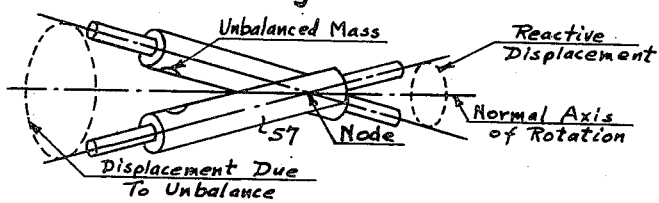
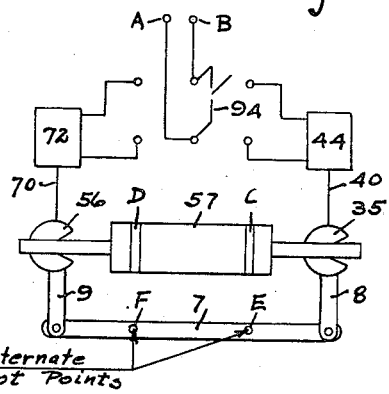
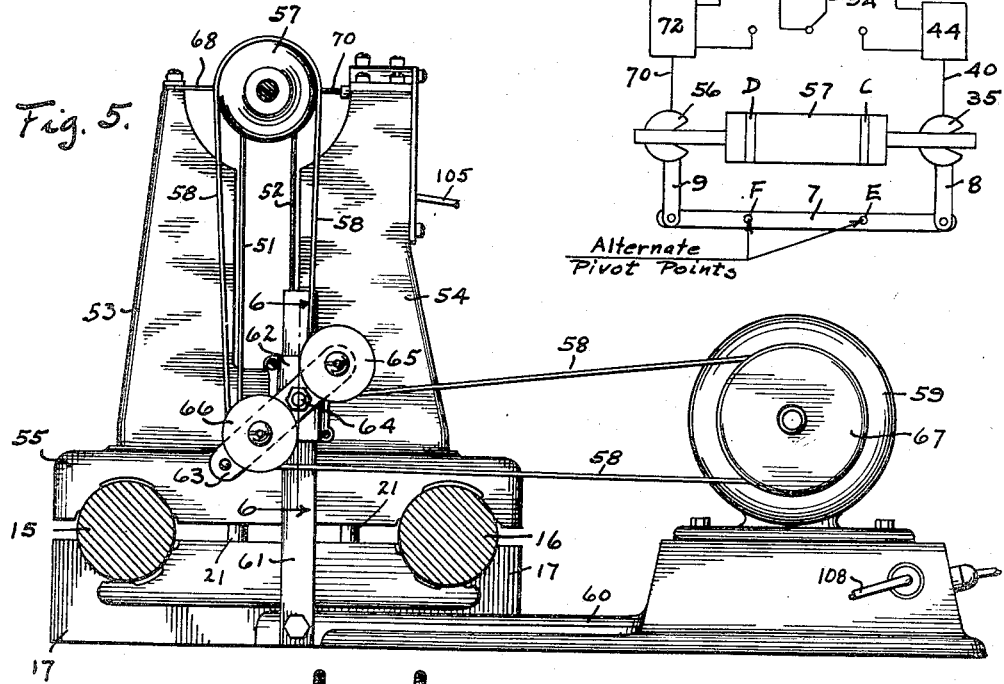
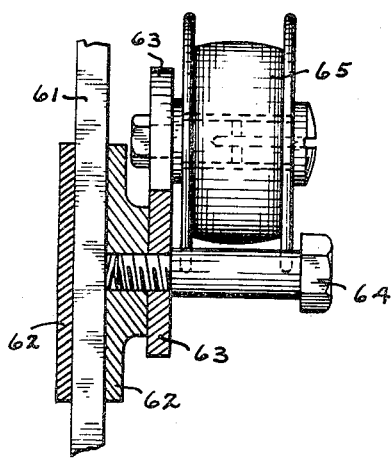

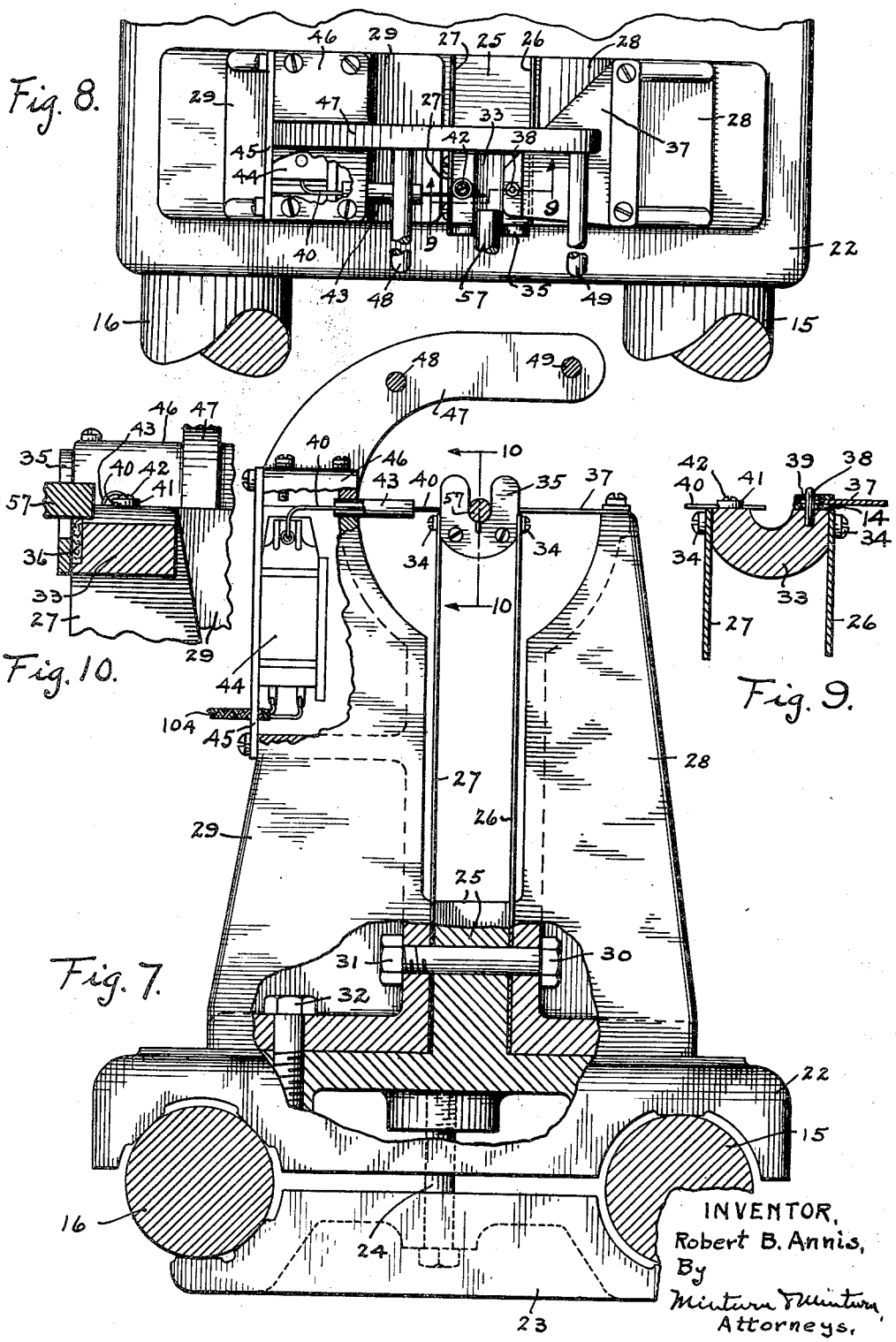

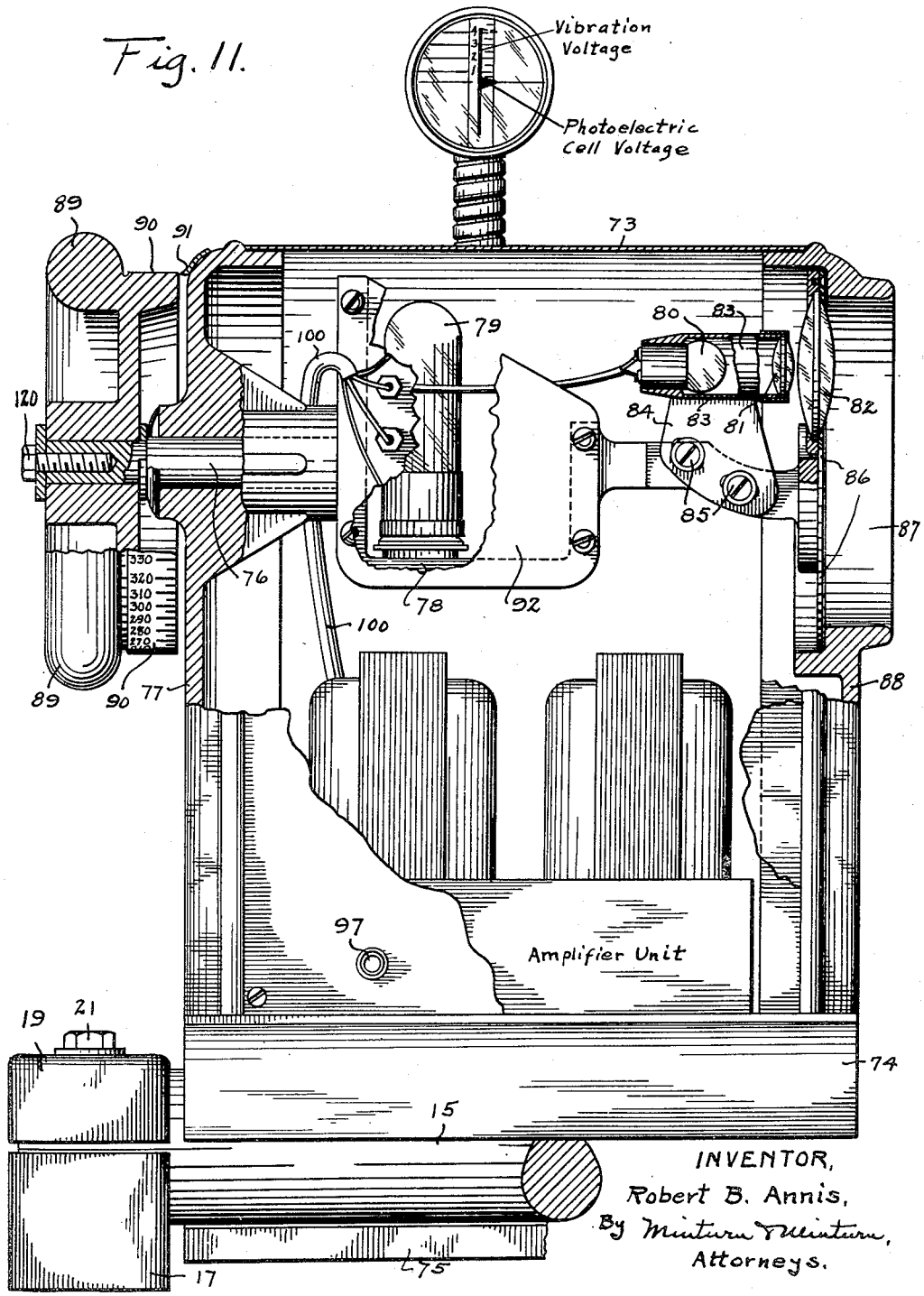

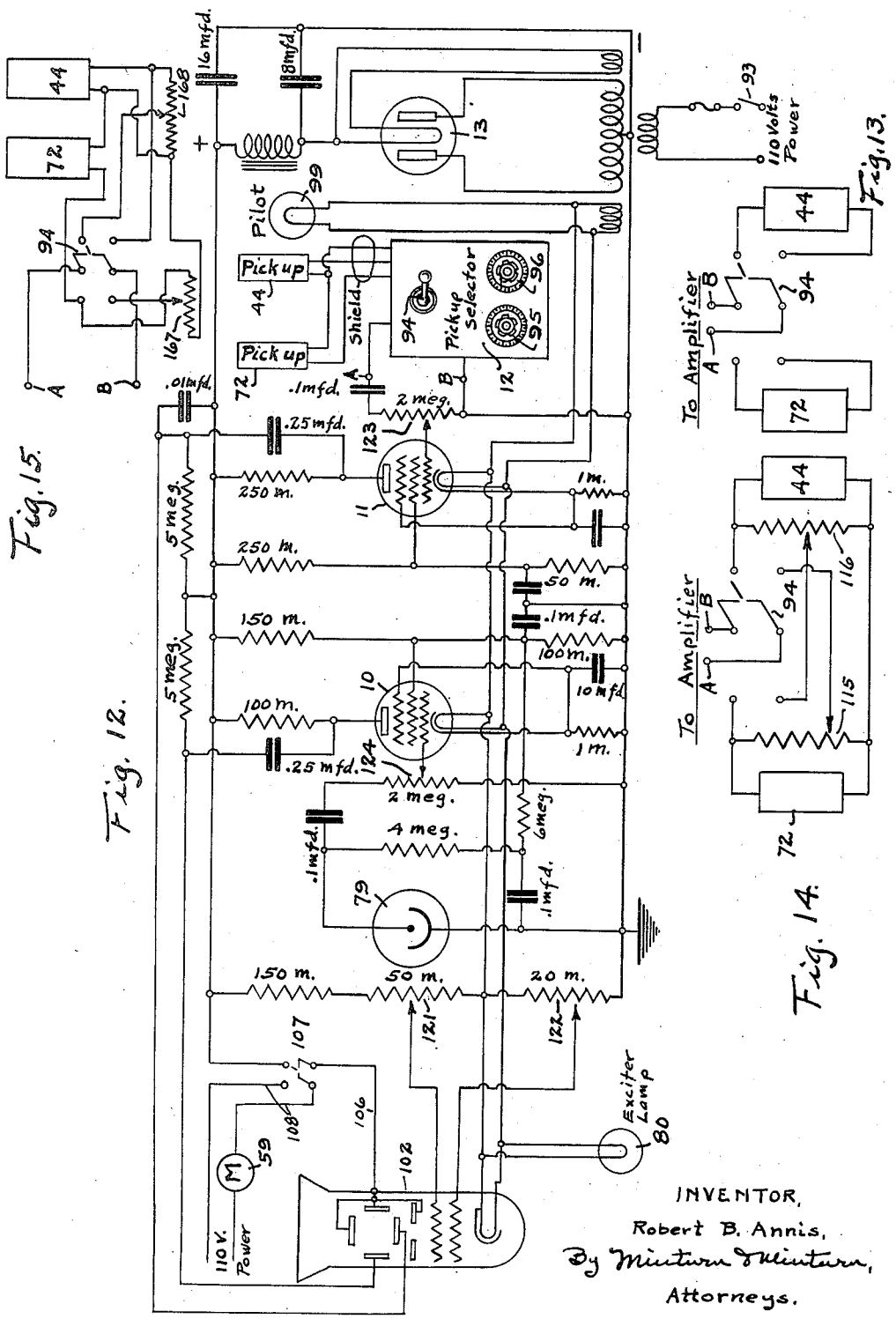

INVENTOR.
Robert B. Annis,
By Minturn & Minturn,
Attorneys.

Aug. 14, 1945.　　　　R. B. ANNIS　　　　2,382,843
ELECTRONIC TYPE BALANCER
Filed March 25, 1943　　　　9 Sheets-Sheet 8

INVENTOR,
Robert B. Annis,
By Minturn & Minturn
Attorneys.

Aug. 14, 1945.　　　R. B. ANNIS　　　2,382,843
ELECTRONIC TYPE BALANCER
Filed March 25, 1943　　　9 Sheets-Sheet 9
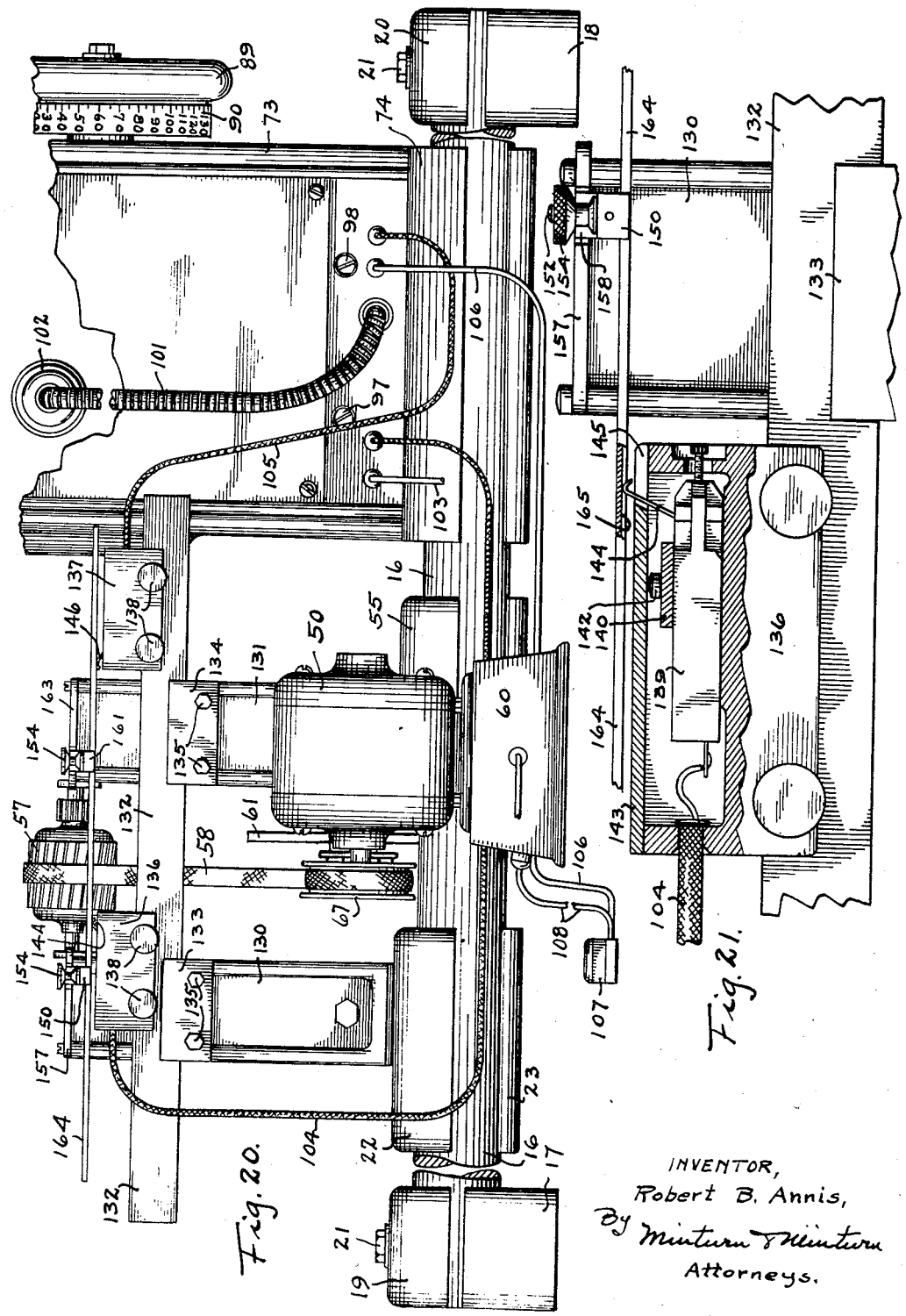
INVENTOR,
Robert B. Annis,
By Minturn & Minturn
Attorneys.

Patented Aug. 14, 1945

2,382,843

UNITED STATES PATENT OFFICE 2,382,843

ELECTRONIC TYPE BALANCER

Robert B. Annis, Indianapolis, Ind.

Application March 25, 1943, Serial No. 480,544

8 Claims. (Cl. 73—66)

This invention relates to means of an electronic type for determining and indicating both the amount and position of unbalance in a rotating part by means of a single reading of the "trace" to be observed on the screen of a cathode ray tube. The means is incorporated in a precision dynamic balancing machine wherein a pulsating voltage is produced by vibration set up by the unbalance of the rotating part to have that voltage applied to one set of the beam control plates in the cathode ray tube and to have a control voltage applied to the other set of cathode ray tube plates, the control voltage being produced by a special photoelectric generator "coupled" to the part being checked for balance, the "coupling" being effected through the medium of a beam of light reflected from or controlled by the rotating part, all without mechanical coupling between the electric generator and the rotating part.

The only indicator employed on the balancing device is the cathode ray tube which is an inertialess electrical device that responds instantly to voltages applied to its control plates. As is standard construction, these two sets of control plates are at right angles to each other so that a voltage applied to one set will cause the cathode ray beam to move across the screen of the tube, such as horizontally; and when a voltage is applied to the other set of control plates, the cathode ray beam will move or trace vertically. The amount of deflection of this cathode ray beam is proportional to the amount of voltage applied to the control plates. This shifting of the cathode ray beam is used to indicate the amplitude of vibration or the amount of unbalance of the part being checked.

Now if two alternating current voltages of the same frequency are respectively applied to the two sets of the control plates of a cathode ray tube, the phase relation between these two voltages may be easily determined by means of the trace patterns observed on the screen of the tube. This feature of the cathode ray tube is used to indicate angular positions of the unbalance of the part being checked.

The invention provides for receiving the part to be checked for balance on two springs supported bearings on which the part is revolved. Lateral vibrations of these spring supported bearings is transmitted mechanically through a spring steel connector wire to individual vibration pickup units, one unit for each bearing. These units may be electromagnetic, photoelectric or piezoelectric in type, the purpose of the unit being to change the mechanical vibration of the particular bearing into a corresponding electrical pulsating voltage. In the present form of the invention herein shown and described, the piezoelectric type of unit is employed. The voltage from the two bearing units is selectively applied to the vertical set of cathode ray tube plates. This control voltage alternates at the same speed or frequency as that of the mechanical vibration, and is proportional to the amplitude of vibration. The height of the trace on the scale of the cathode ray tube will indicate the amount of unbalance. The absence of any vertical height to the trace indicates there is no vibration of the bearing support, the induced voltage from which is being applied to the control plates of the tube, and consequently the revolving part is then indicated to be in balance.

The position of unbalance which must be made known to the operator in order to permit him to make the proper correction at the proper location on the part being tested, is indicated by this invention by the phase relation between the voltage above indicated as being produced by the vibration, and a second voltage that is applied in conjunction with the revolving part being tested. This control voltage, which may be indicated as that due to rotation of the part, is applied by a special photoelectric system located in a headstock or scanning head of the structure. This system consists of a light source, a photosensitive or photoelectric cell (hereinafter identified as a PE cell), and an associated optical system, all mounted in such a manner as to permit those elements to be turned through 360 degrees by the rotation of a calibrated handwheel. The axis of rotation of those elements is in line and parallel with that of the part being checked.

For maximum efficiency, the lens system for both the PE cell and the light source are on the same optical axis. The light from the exciter lamp filament is projected and focused onto the end of the scanned surface of the part being checked coincident with the focus of the PE cell optical system. The amplified varied voltage of the PE cell is applied to the horizontal set of the cathode ray tube control plates. By turning the scanning head with the above indicated elements by the handwheel, the phase relation between the vibration "amount" voltage on the vertical plates, and the "angle" voltage on the horizontal plates can be shifted and readily determined by observation of the visible trace on the screen of the tube.

In any revolving part that has appreciable length, there will be a reactive effect resulting from the unbalance toward one end, generally causing the opposite end to tend to vibrate 180 degrees out of phase in relation to the vibration of the unbalanced end. This reactive effect can be nullified or cancelled so that the end being checked will not be affected by any unbalanced condition of the opposite end. Elimination of this reactive effect can be accomplished by any one of the three methods, namely, mechanically restraining the end opposite from that being checked so that it can not vibrate, thus preventing any reactive vibration; second, electrically adding algebraically the two voltages from the two pickup units, assuming that in the revolving part one end is balanced and the other end is unbalanced, one pickup will receive vibration directly caused by displacement from the normal axis of rotation created by unbalance of that particular pickup unit connected end, while the other pickup will receive vibration due purely to the reactive displacement of the part (the A. C. voltages produced by these two pickups are usually 180 degrees out of phase, or are of opposite, instantaneous polarity, thus allowing the voltages to be added in various proportions to cancel each other or produce a zero reading, this adding being accomplished in the present invention by a simple potentiometer input circuit); and third, shifting the pickup units themselves to have one pickup unit shifted to a nodal point. For a given location of a correction plane through the revolving part, the free axis of the part being checked will tilt (due to unbalance) in such a way that one point along that free axis will act as a pivot or a node. These three methods will be more fully explained hereinafter.

Figure 17:
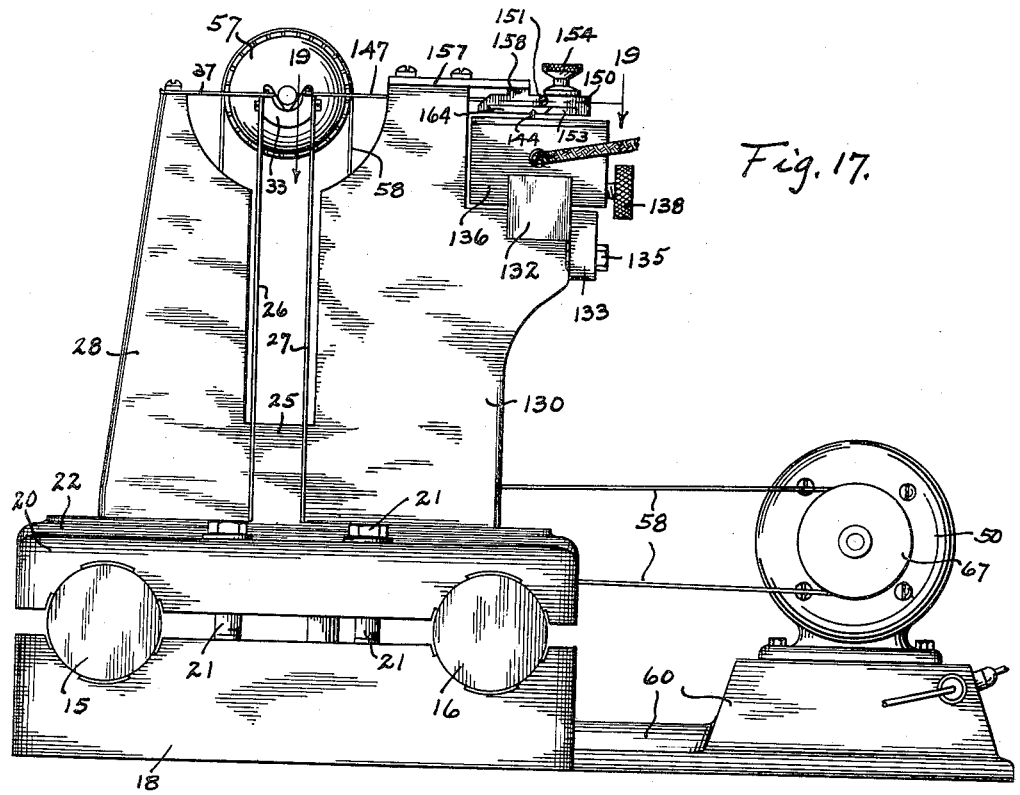
Figure 18:
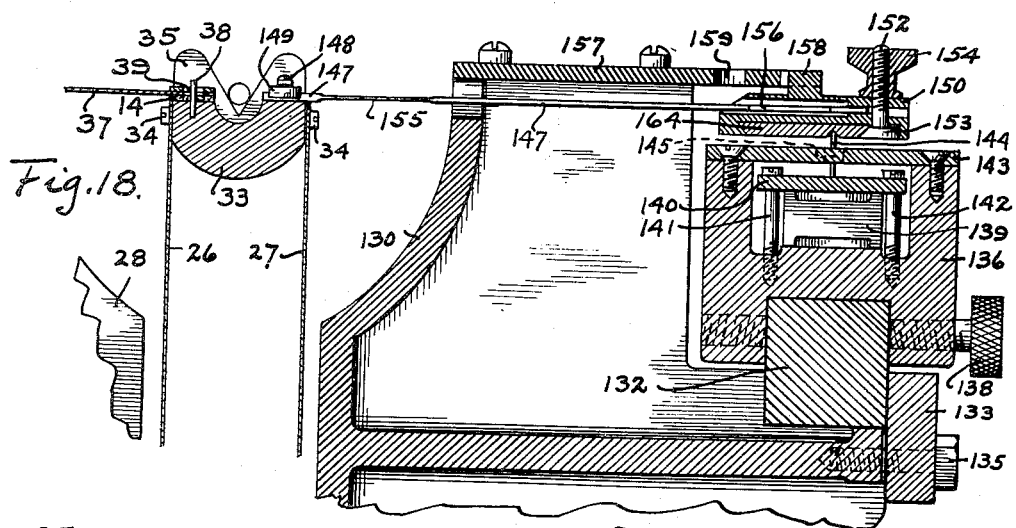
Figure 19:
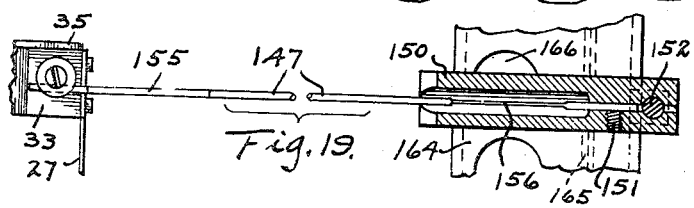

An important object of the invention is to eliminate any mechanical coupling between a control voltage generator and a part being checked for balance or unbalance. A further important object of the invention is to permit extremely rapid checking of and the indicating of both the amount and position of the unbalance in production work with extreme accuracy and minimum amount of time employed on each part being checked. These and many objects and advantages of the invention, including the unique association of the various elements as specifically set forth in the appended claims, will become apparent to those versed in the art in the following description of the invention as illustrated in the accompanying drawings, in which Fig. 1 is a side elevational view of a structure embodying the invention;

Fig. 2, a detail on an enlarged scale in transverse section on the line 2—2 in Fig. 1;

Fig. 3, a top plan view;

Fig. 4, a detail in inner end elevation on an enlarged scale of the upper portion of the scanning head;

Fig. 5, a view in transverse section on the line 5—5 in Fig. 1;

Fig. 6, a detail on an enlarged scale in partial section on the line 6—6 in Fig. 5;

Fig. 7, a view on an enlarged scale in section on the line 7—7 in Fig. 1;

Fig. 8, a top plan view of the bearing standard shown in Fig. 7;

Fig. 9, a detail on a still further enlarged scale in section through the bearing block on the line 9—9 in Fig. 8;

Fig. 10, a view on an enlarged scale in section on the line 10—10 in Fig. 7;

Fig. 11, a view in side elevation in partial section on an enlarged scale of the scanning head;

Fig. 12, a wiring diagram showing the various circuits employed;

Fig. 13, a diagram of a vibrator pickup voltage selector circuit for a restrained bearing nullification of reactive unbalance;

Fig. 14, a diagram of a vibrator pickup voltage selector potentiometer circuit for electrically nullifying reactive unbalance;

Fig. 15, a diagram of a vibrator pickup voltage selector circuit for nullification of reactive unbalance by shifting of a pickup unit to a nodal point;

Fig. 16, a top plan view of a structure embodying the invention incorporating means for pickup unit shifting to nodal points;

Fig. 17, a right-hand end view in elevation of the form illustrated in Fig. 16;

Fig. 18, a detail in vertical transverse section on an enlarged scale on the line 18—18 in Fig. 16;

Fig. 19, a detail in horizontal transverse section on an enlarged scale on the line 19—19 in Fig. 17;

Fig. 20, a view in rear elevation of the form of the invention illustrated in Fig. 16;

Fig. 21, a detail in rear elevation and partial section on an enlarged scale of a shiftable pickup unit mounting;

Fig. 22, a schematic diagram illustrating the action of a cylinder revolving above resonance and being unbalanced toward one end; and Fig. 23, a schematic diagram illustrating the method of nullifying reactive balance by mechanical restraint.

Like characters of reference indicate like parts throughout the several views in the drawings.

CONSTRUCTION

A pair of bars 15 and 16, herein shown as being cylindrical, are selected to have sufficient cross-sectional area to make them rigid within the limit of use of the balancing machine. These bars 15 and 16 are supported in spaced apart parallel relation on end blocks 17 and 18 respectively by having the bars resting on these blocks in bearings provided thereacross. In order to hold the bars 15 and 16 rigidly in alignment, clamp blocks 19 and 20, each having bearings thereacross, are placed down on the top sides of the bars 15 and 16 above the respective under blocks 17 and 18 and these clamp blocks 19 and 20 are there secured in their respective positions by means of cap screws 21, herein shown as two in number in each instance, passing through the clamp blocks and down into the under bearing blocks. These bars 15 and 16 and their end supports thus described constitute the base for the light head and the structure for supporting the specimen or part to be checked.

An outer bearing support, primarily illustrated in Figs. 1, 3, 7 and 8, is formed to have a base 22 with hollowed out bearing surfaces in its under side to rest on and be guided by the two bars 15 and 16, Fig. 7. A base clamp 23 is employed to come up from the under sides of the bars 15 and 16 and be supported by means of a cap screw 24 slidingly passing through the clamp 23 and screw-threadedly engaging in the under side of the base 22 as a means for compressively drawing the base 22 into engagement with the bars 15 and 16 for selective positioning and retaining of the base along those bars.

The base 22 has an upwardly extending web or tongue 25 with parallel vertically disposed front and rear faces, against which faces are positioned relatively, leaf springs 26 and 27, the major portions of which springs extend upwardly beyond the web 25. A front bracket 28 rests by its lower end on the top of the base 22 and by a limited area of its rear face bears against the lower end of the spring 26, this limited area terminating by its top edge at the level of the top end of the web 25. In like manner a rear bracket 29 has its lower end resting on the top side of the base 22 and a limited area of its front face bearing against the rear side of the spring 27, this limited area of the bracket 29 terminating by its top edge at the top level of the web 25. A through bolt 30 passes through the bracket 28 (the rear web thereof, Fig. 7), the leaf spring 26, the web 25, the leaf spring 27, and the bracket 29 (the forward web thereof), and by means of the nut 31 on the rear end thereof these various members are pulled one against the other into compressive engagement about the intervening web 25. Preferably for greater stability, the cap screw 32 is passed down through the foot of the rear bracket 29 to screw-threadedly engage in the base 22.

The two spaced apart leaf springs 26 and 27 are symmetrical in shape, each having that form as indicated in Fig. 1 where the contour of spring 26 is visible, one vertical edge of the spring being at right angles to a lower edge whereas the other vertical edge is inclined from the lower edge toward that vertical right angle edge to cause the spring to have a width at its top end narrower than that at its lower end. This permits the aligning of the two springs 26 and 27 to have the right-angle vertical edges along corresponding faces of the brackets 28 and 29 and at the same time permit the springs to be reduced in width in respect to their base ends. These two springs 26 and 27 extend upwardly from the web 25 in parallel alignment and spaced from the inner opposing faces of the brackets 28 and 29 above the level of the top end of the web 25. Between the upper ends of these springs 26 and 27 is secured a bearing block 33 by any suitable means, such as by screws 34 respectively passing through the upper ends of the two springs and engaging within the block 33 therebetween. On the end of the block 33, presented at those edges of the springs 26 and 27 that are parallel with the sides of the brackets 28 and 29, is mounted a bearing plate 35. This bearing plate 35 is thus positioned to be at the sides of the brackets 28 and 29 instead of toward the centers thereof. It is to be noted that the bearing plate 35 is provided with a notch entering from the upper side which provides for centering of the shaft of the member to be tested. The notch provided in the bearing plate 35 may assume different contours, for example, the U-shape contour as shown in Fig. 7 with a circular bearing end, or the V-shape form as illustrated in Figs. 17 and 18. Preferably the bearing block 33 is cut away to form a pocket 36 immediately back of the plate 35, Fig. 10, wherein some oil retaining substance, such as fine waste, may be inserted to provide lubrication of the bearing surface across the plate 35.

The top ends of the brackets 28 and 29 are in effect spaced apart from the upper ends of the springs 26 and 27 by reason of the fact that both brackets 28 and 29 are cut away, as illustrated in Fig. 7, to have their upper, inner opposing faces concave so as to provide clearance therebetween.

From one of the brackets, herein shown as bracket 28, extends a plate 37 over the top of one side of the bearing block 33 to be spaced slightly thereabove out of contact therewith. The plate 37, herein shown as substantially triangular shaped, Fig. 8, is provided with a hole therethrough in that portion overlying the bearing block 33, and a pin 38 fixed to the block 33 extends upwardly and normally freely through the hole 39 in that plate 37, Fig. 9. The diameter of this hole 39 plus the diameter of the pin 38 constitutes the limiting factors of lateral travel of the block 33 upon yielding of the springs 26 and 27, these springs normally holding or positioning the pin 38 centrally of the hole 39. It is to be understood that the plate 37 is rigidly fixed by its front edge portion along the top end of the bracket 28.

Between the under side of the plate 37 and the top side of the bearing block 33, Fig. 9, is interposed a thin pad of felt 14 as a means for damping lateral vibration of the bearing block 33. The plate 37 is provided to exert a slight downward pressure on this felt for the damping effect. The damping effect may be varied by varying the pressure of the plate 37 on the felt and this pressure variation may be had by bending the plate 37 upwardly or downwardly as the requirement may be. This damping of the travel of the bearing block 33 tends to eliminate low frequency hunting and also tends to prevent external vibrations from affecting the vibration of the block 33.

A length of spring steel piano wire 40 has one end held in fixed engagement with the top side of the bearing block 33 on the side opposite from that to which the pin 38 is secured. In the form herein shown, the wire 40 is engaged under a washer 41 forced down over the wire 40 by means of a screw 42 screw-threadedly engaging from the top side of the block 33. From the block 33, the wire 40 extends horizontally through a tube 43 without contact therewith. The outer end of this wire 40 is turned downwardly and thence laterally into engagement with a pickup unit 44 that is mounted within a cavity provided within the bracket 29 entering from its rear side and covered by a terminal insulating panel 45.

The tube 43 is gripped between the top side of the bracket 29 and a cover plate 46 and is provided as a shield about the wire 40. An arm 47 extends integrally from the plate 46 upwardly and thence around substantially horizontally forwardly to terminate over the bracket 28 and to carry two spaced apart belt hanger pins 48 and 49. These pins 48 and 49 extend laterally from the arm 47 to project beyond the inner faces of the brackets 28 and 29.

In the same manner a second bearing block 50 is supported in axial alignment with the block 33 by means of springs 51 and 52 carried between front and rear brackets 53 and 54 respectively mounted on a base 55 adjustably secured along the bars 15 and 16 in the same manner as is the base 22. The springs 51 and 52 are counterparts of springs 26 and 27. The bearing block 50 carries a bearing plate 56 which is a counterpart of the bearing plate 35 on the block 33. As indicated in Fig. 3, the bearing plates 35 and 56 are positioned in opposition one to the other in axial alignment and are substantially within the respective planes of the inner opposing faces of the respective pairs of brackets 28, 29 and 53, 54 whereby these bearing plates may be positioned as close together as possible to rotatively support the piece to be checked for balance.

The bearing block 50 has its horizontal travel limited by means of a plate 68 which operates in the same manner as the plate 37 to extend over the top of one side of the bearing block 50 to have a pin 69 extend upwardly through a hole in the plate 68, the limit of travel being the clearance between the pin 69 and the margin of the hole. A felt pad is interposed between the plate 68 and the block 50 to operate in the same manner as described above in reference to the felt pad 14 and block 33. A length of spring steel piano wire 70 is fixed to the opposite side of the bearing block 50 and extends through a sleeve 71 without contact therewith into a cavity provided in the back bracket 54 to bend downwardly and laterally and be engaged into the pickup unit 72 mounted within that cavity.

For convenience in terminology, the complete unit mounted on the base 22 will be designated as the right-hand vibration pickup carriage and the assembly mounted on the base 55 will be termed the left-hand vibration pickup carriage. The purpose of making these two carriages to be adjustably positioned along the bars 15 and 16 is simply to provide an adjustable spacing therebetween in accordance with the length between bearings of the piece to be balanced.

While of course any rotatable element within the proper range of size for the selected dimensions of the two carriages may be checked for balance, for the purpose of illustration, a motor armature 57 is selected as the part to be checked for balance and is herein shown as having its shaft carried by the bearing plates 35 and 56.

In order to rotate the armature 57 about its own axis, a light flexible fabric belt 58 is looped around the periphery of the armature 57 (around the pole pieces in the illustrated form of armature) and this belt is carried downwardly with both sides in substantially vertically aligned positions. A drive motor 59 is mounted upon a separate elongated base 60 on a rear end portion of that base while the forward portion of the base is positioned to extend under the bar 16. On the side of the forward end portion of the base 60 is rigidly attached thereto a guide bar 61 extending vertically upwardly from the base between the bars 15 and 16. On this bar 61 is mounted a head 62 shiftable therealong freely. In turn, a yoke bar 63, Figs. 5 and 6, is mounted on the right side of this head 62 to be adjustably rockable around a horizontally disposed axis determined by the cap screw 64 which passes through the yoke bar 63 and screw-threadedly engages with the head 62, a shoulder being provided on the screw 64 to abut the outer face of the yoke bar 63 and carry it into compressive engagement with the head 62 as a means of securing the yoke bar 63 in selected rocked positions.

Mounted on the yoke bar 63 at substantially equal distances from the center of rocking of the yoke bar 63 are two belt pulleys 65 and 66. The belt 58 is carried by its respective rear and front sides downwardly and around the front sides of the pulleys 65 and 66 and thence rearwardly to wrap around the motor drive pulley 67. The vertical positioning and alignment of the two upwardly extending flights of the belt 58 is secured by suitable rocking of the yoke bar 63 to shift the positions of the pulleys 65 and 66 which in effect will vary the spacing between the front and rear flights of the upwardly extending parts of the belt 58. The required degree of tension of the belt 58 is secured by the weight of the crosshead 62 and the parts carried thereon, it being remember that the crosshead 62 is free to drop downwardly along the bar 61 under the influence of gravity. This sliding arrangement for the mounting of the return pulleys 65 and 66 also enables the operator to lift the belt off of the armature 57 and hook it over the pins 48 and 49 when the armature 57 is to be removed from the carriage supporting bearings, the crosshead 62 lifting upwardly along the bar 61 to permit that lifting of the belt 58. By suitable rocking of the yoke bar 63, the vertical parallel alignment of the upwardly extending parts of the belt 58 is obtained even though the diameters of the various pieces to be checked may vary. The important feature is that these upwardly extending parts of the belt 58 be positioned to run vertically.

A headstock, generally designated by the numeral 73, is provided with a base 74 that is notched from its under side to fit over and slide along the bars 15 and 16. The head stock is secured in selected positions along these bars by an under clamp bar 75 engaging the under sides of the bars 15 and 16 and pulled toward the base 74 to afford the same clamping arrangement as provided for the base 22 of the right-hand carriage as illustrated in Fig. 7 where the cap screw 24 is employed as the interengaging medium.

In the upper portion of the headstock 73 is mounted a scanning head including an optical system carried by a shaft 76 rotatably mounted in a bore provided through the end wall 77, the axis of the shaft 76 being parallel to the axes of the bars 15 and 16. On the inner end of the shaft 76 within the headstock 73 is fixed a bracket 78 formed with an off center seat to carry a PE cell 79 thereon, and further formed to extend to the right to carry an exciter lamp 80, and still further to the right a lens system, herein shown in the present form as being comprised of the two lenses 81 and 82. The mountings of these various elements is made to be such that the two lenses 81 and 82 are on the same optical axis.

The exciter lamp 80 is mounted within a tube 83 carried by an arm 84 that is adjustably fixed to the bracket 78 by means of a pair of screws 85 passing through slots in the arm 84 and screw-threadedly engaging the bracket 78 to the end that the axis of the tube 83 may be tilted in reference to the axis of the shaft 76, the tube 83 being mounted, in the present instance, to one side of that shaft axis. The exciter lamp lens 81 is positioned across the tube 83 at the end opposite that end into which the lamp 80 is inserted and carried. The focusing of the beam of light from the lamp 80 through the lenses 81 and 82 is obtained by axially shifting the lamp 80 within its friction mounting within the end of the tube 83.

The PE cell lens 82 is fixed in position back of an opening in an opaque disc 86 that is mounted across the end of the bracket 78 to be rotatable therewith. This disc 86 forms a closure across a circular window 87 that is provided through the right-hand end wall 88 of the headstock 73. This structure permits shifting of the exciter lamp light beam throughout at least 360 degrees of travel around the axis of the shaft 76. To shift the light beam, a handwheel 89 is fixed on the outer extending end of the shaft 76 whereby the wheel may be grasped by the operator's hand to cause the desired or required shifting. Secured to the handwheel 89, herein shown as integrally, is a drum 90 which is calibrated in degrees whereby the angular position of the emitted beam of light from the exciter lamp 80 may be determined in reference to the fixed pointer 91 carried on the upper side of the end wall 77 of the headstock 73. Provision is made for suitably placing the exciter lamp and the PE cell in respective electric circuits without interfering with the 360 degrees travel of the scanning head. This may be accomplished in the usual manner by brushes riding on drum rings, or more simply, as herein shown, a terminal panel 92 is fixed on the side of the bracket 78 whereby suitable flexible leads of sufficient length may be carried therefrom in a cable 100 down to an amplifying and control unit mounted within the headstock 73 on the base 74. The exciter lamp 80 and the PE cell 79 are connected with terminals on this panel.

On the forward wall of the headstock 73 is mounted a power line input control switch 93; a left-right selector switch 94 interconnecting respectively with the left and right-hand pickup units 72 and 44; a pair of potentiometer control and indicating dials 95 and 96, one for each of the pick-up units; a horizontal gain control (angle) 97; a vertical gain control (amount) 98; and a pilot lamp 99, all of which will be more fully explained herein below in describing the operation of the device.

Extending from the rear side of the headstock 73 is a cable carrying flexible arm 101 which supports on its upper forwardly directed end a cathode ray tube 102 (No. "913," being the commercial designation of one type of tube usable). This tube is of the type which has a generally cylindrical metallic incasing shell with the screen visible across a front opening and is provided with a scale across the screen. A power input cable 103 enters the headstock 73 from the rear and shielded conductor cables 104 and 105 lead respectively from the right and left-hand vibration pickup carriages to enter the headstock 73. In addition, a cathode ray plate voltage control cable 106 is interconnected between a foot controlled switch 107 and the headstock 73.

This foot controlled switch 107 (normally on the floor in front of the balancer) is further employed to start and stop the drive motor 59 through the cable 108. Reference is made to the complete wiring diagram, Fig. 12, to indicate the electrical hook-up between these various elements and also to show the diagram of the complete electrical system. Observation of the diagram will indicate the system to consist essentially of the power input rectifier circuit using the tube 13; the vibration pickup input circuits through the selector 12; the PE cell 79 and its input circuit; the amplifying circuit employing the tubes 11 and 10 for amplifying both the inputs of the pickups and the PE cell; and the cathode ray tube 102.

The structure above described is that which would be employed for the electrical nullification of the reactive unbalanced effect produced by the part being checked. For this structure, the potentiometer circuit illustrated in Fig. 14 will be that circuit employed in the selector 12 where the variable resistance 115 will be controlled by the dial 95 and the variable resistance 116 will be controlled by the dial 96. The terminals of the potentiometer circuit of Fig. 14, A and B, will be the terminals A and B of the pickup selector in Fig. 12.

Reference is made to the diagram, Fig. 23, which schematically illustrates the nullification of the reactive unbalance effect by mechanical restraint. In the diagram, the revolving element to be checked, 57, is revolubly supported on the bearing plates 35 and 56, which plates are respectively interconnected with the pickup units 44 and 72 through the steel wires 40 and 70 respectively. These bearing plates 35 and 56 are also respectively interconnected through arms 8 and 9 with a bar 7, the arms 8 and 9 being rigidly connected to the members 35 and 56 and pivotally connected to the bar 7. Assuming that there is an unbalanced mass located within the zone D of the element 57 and that a reactive effect will be set up at the bearing 35, producing a node on the normal axis of rotation at the intersection of the zone C therewith, then the bar 7 would be pivoted at the location E to permit the bar 7 to rock thereabout. In reference to the diagram of Fig. 23, no potentiometer or voltage mixing circuit is shown. When the pivot is at E to check vibration correction in the plane D, the switch 94 would be thrown to the left to utilize voltage output of the pickup 72, and any voltage tending to be generated in pickup unit 44 would not be applied to the cathode ray tube plates—that unit 44 circuit would be open. The reverse position of the switch would be employed when the pivot is at F.

Where the mechanical restraint structure is to be employed, then the circuit in the pickup selector 12 would be that shown in Figs. 13 and 23 where the terminals A and B correspond to the like terminals in Fig. 12. In this case, for this elemental circuit, dials 95 and 96 would not be employed.

The third method of nullifying the reactive effect of the unbalance of one end of the rotating part is accomplished through the use of adjustable vibration pickup points, requiring the modification of the primary structure above described. Reference is made first to Fig. 22 where the behavior of a rotating unbalanced cylinder is illustrated. The cylinder corresponding to the armature 57 to which reference has been made, if in perfect dynamic balance, would have its axis of rotation coincide with the indicated normal axis of rotation. Assuming that the cylinder is not in balance and that the unbalanced mass is located toward one end as illustrated, then the axis of the element would depart from the normal rotation axis to have the unbalanced end revolve in the path of a circle whose center is the normal rotation axis. For a given location of a correction plane through the rotating element, the free axis (axis of the element itself) will tilt in such a manner that one point along its axis will act as a pivot or a node at the intersection of the element axis with the normal rotation axis. The relation between this nodal point and the correction plane is similar to that between the center of percussion and the point of impact. The further away the correction plane is from the center of gravity of the element, the closer the node will be to the center and vice versa. A correction plane at the center of gravity corresponds to a node at infinity and represents a static unbalance condition.

Now if it were possible to locate a vibration pickup unit at the node, then it can be readily seen that the unbalanced mass in the opposite correction plane would not affect that particular pickup unit. In other words, if one of the pickup units 44 or 72 is shifted along the balancer to the nodal point, and the second one of those pickup units is located to receive the vibrations from the element at the bearing nearest the selected correction plane, then the reactive effect of the unbalance is nullified insofar as that other pickup unit is concerned.

To accomplish this object, there are substituted for the rear brackets 29 and 54, a pair of brackets 130 and 131 so designed as to carry in seats across their rear upper end portions a rigid bar 132. This bar, in the present showing, is rectangular in cross-section and is longitudinally adjustably positioned in reference to the supporting brackets 130 and 131 and held by means of the respective clamp bars 133 and 134, carried by the brackets 130 and 131 respectively by means of cap screws 135. That is, the bar 132 may be released from compressive engagement with either one or both of the brackets 130 and 131 to permit not only those brackets being adjustably spaced one from the other, but also to permit the bar 132 to be shifted to either the right or the left of those brackets as an additional length of the bar therebeyond may be required.

The upper portions of each of the brackets 130 and 131 are so formed as to permit pickup unit carriages 136 and 137 to engage with the upper portion of the bar 132 and slide therealong. In the present form of the invention, these carriages 136 and 137 are identical in shape and size and each is provided with an under rectangular slot extending longitudinally thereacross, into which slot the upper portion of the bar 132 is slidingly received. In effect, each carriage 136 and 137 has a front and a rear leg extending down on the corresponding sides of the bar 132. To permit the carriages to be securely engaged in any selected position of travel along the bar 132, thumb screws 138 (two in each carriage) are employed to be screw-threadedly carried through the rear leg of each carriage and abut the rear side of the bar 132, Fig. 18. If need be, the carriages 136 and 137 may be shifted entirely along the length of the bar 132 without interference with any other part of the balancer, particularly the brackets 130 and 131.

Within each carriage 136 and 137 is located a pickup unit, herein shown as of the piezoelectric type embodied in the commercial form within a metallic case 139, being identical with the pickup units 44 and 72 shown in the other forms of the invention. The pickup unit 139 in each carriage is secured in position by means of a crossbar 140 extending over the unit and having screws 141 and 142 carried down through the ends of the bar 140 along the outer sides of the unit 139 and screw-threadedly engaged in the carriage, Fig. 18. A carriage cover plate 143 is provided to cover over the unit 139 in each instance and protect it from external damage. In referring to Fig. 21, it is to be noted that the carriage 136 has been shifted in relation to the bracket 130 from that position shown in Fig. 20 to a position to the left thereof (viewed from the rear) in order to permit a clear view of the various parts. A pickup unit operating wire 144, Fig. 21, is secured to the unit in the usual manner as the operating member to function by lateral movement, that is, in respect to the balancer as a whole in a fore and aft direction.

This wire 144 is inclined, Fig. 21, from the unit 139 to the right when viewed from behind the machine, and has its upper end curved around and downwardly in the nature of a hook to form an upper arcuate end which projects above the top level of the cover 143, through a slot 145 formed in the end thereof. The slot 145 has a width, as indicated by the dash lines in Fig. 18, sufficient to permit ample lateral travel of the wire 144 but is limited in width to prevent undue bending of the wire 144 as a protective factor. Also the extension of the wire 144 above the level of the cover 143 is limited to that extent that should pressure be applied on top of the wire to bend it downwardly through the slot 145, the top end of the wire 144 will reach the top plane of the cover 143 before any damage is done to the pickup element 139 or a permanent set created in the wire 144. That is, the extending length of the wire 144 is limited to serve as an additional safety factor. In the carriage 137, the element 139 therein is mounted to be in a reverse position from that indicated in Fig. 21 so that its operating wire 146, Fig. 20, is sloped to the left (viewed from the rear, Fig. 20). The wire 146 is interconnected with its pickup unit in identically the same manner as is illustrated in Fig. 21 and the same safety factors are employed.

Secured to the bearing block 33 by one end is a steel wire 147 (.051 piano wire being suitable) by means of a screw 148 pressing a washer 149 thereagainst. This wire 147 is carried substantially horizontally rearwardly from the block 33 freely through the upper end of the bracket 130, freely through a bore of a clamp 150 to be rigidly connected thereto by means of a set screw 151, Figs. 17 and 19. This clamp 150 is preferably made out of a light material, such as aluminum, to reduce weight. The under side of the clamp 150 is slotted transversely thereacross to have an under-cut forward edge. A clamp bolt 152 extends slidingly vertically through the clamp toward its rear end and carries a head 153, the forward edge of which is undercut to correspond with the forward edge of the clamp slot. A thumb nut 154 screw-threadedly engages the upper end of the bolt 152 from the top side of the clamp 150 as means for causing the bolt 152 to travel longitudinally and permit the head 153 to be pulled up within the under slot of the clamp 150.

The wire 147 is reduced to a thing rectangular cross-section 155 for a portion of its length adjacent the bearing block 33. This section has a horizontal width equal to the normal diameter of the wire 147 but its vertical thickness is reduced such as by grinding the wire from the upper and under sides to leave the final section thickness. This section reduced in thickness in relation to the normal diameter of the wire 147 permits the wire 147 to flex in an up and down manner through this section 155. Toward the other end of the wire 147 a section 156 is provided to have a width in a horizontal direction less than the diameter of the wire produced, such as by grinding the wire from both sides to leave the section in some such form as indicated in Fig. 19. This section 156 permits the wire 147 to flex throughout that zone in lateral directions as opposed to vertical directions. Preferably the section 156 is within the bore of the clamp 150.

A plate 157 extends from the top of the bracket 130 rearwardly thereof and is provided with a notch or slot entering from the rear edge within which is normally centered a lug 158 extending upwardly from the clamp 150 as a safety limit stop. The notch in the plate 157 is made to be somewhat wider than the lug 158 so as to permit a limited travel horizontally between the faces of the notch. Also the clamp 150 is so positioned in accordance with the length of the wire 147 that the lug 158 is spaced somewhat rearwardly of the forward face of the plate notch as indicated in Fig. 18. Also, the plate 157 is preferably provided with a peep hole 159 through which may be observed the position of the wire 147 in relation to its position within the bore of the clamp 150 so that the clamp 150 may be adjusted on the wire 147 to have the wire centered in that bore without contact with the wall thereof. To permit visualization of this position, the forward end of the clamp 150 is preferably beveled so as to permit observation of the wire position in the end of the bore.

To the other bearing block 50 is secured a steel wire 160 identical with the wire 147 in respect to size, the two thin flexible sections, and length. The wire 160 extends freely through the bracket 131 and engages by its rear end in a clamp 161 which is identical to the clamp 150 already described. The clamp 160 is likewise limited in horizontal travel by means of a lug 162 extending vertically upwardly through a notch in the cover plate 163 secured to the top of the bracket 131. In the present form of the invention, both bracket cover plates 157 and 163 overhang their respective brackets so as to receive the upturned clamp lugs 158 and 162 within the respective notches.

A vibrator bar 164 is formed out of any suitable light metal that is quite rigid in nature, such as an aluminum alloy. The under side of the bar 164 is provided with a slot 165 of any cross-section shape, herein shown as V-shaped, extending longitudinally throughout the length of the bar in parallel relation to its edges. The edges of the bar are beveled to slope inwardly from the top face of the bar, the slope of these edges corresponding to the slopes of the forward undercut edge of the slot in the clamps 150 and 161 and the heads 153 of the bolts 152. The vibrator bar 164 has the respective clamps 150 and 161 slidingly engaged therealong to have the V-slot face turned downwardly, as indicated in Fig. 18. The clamps 150 and 161 may be fixed in position along the vibrator bar 164 by tightening the nuts 154 to clamp the bar 164 against the upper faces of the slots across the respective clamps by reason of the bolt heads 153 having their beveled edges engaging against the corresponding beveled edge of the bar 164.

When the vibrator bar 164 is thus engaged with the two clamps 150 and 161, the slot 165 will receive the upper ends of the pickup unit operating wires 144 and 146, the upper ends of these wires operating in effect as trolleys so that each or both of the carriages 136 and 137 may be shifted along the bar 132 to have the upper ends of the operating wires 144 and 146 slide along in that vibrator bar slot 165 without interfering with or requiring any change in position of the vibrator bar 164 in relation to its attached clamps 150 and 161, that is, unless the bar 164 must be shifted to have a major length extend beyond one of the brackets 130 or 131 to take care of some unusual unbalanced condition of the test part.

In any event, the vibrator bar will be so set up as to have the clamps 150 and 161 secured thereto in those positions where their respective lugs 158 and 162 will be substantially centered within the respective notches of the bracket cover plates 157 and 163. Thus it is to be seen that the vibrator bar 164, with its attached clamps from which extend the respective wires 147 and 160, rests entirely upon the two pickup unit wires 144 and 146. The entire mass, however, of the assembly resting on these wires is low, this mass being further reduced, in the present showing, by reason of the plurality of holes 166 being provided through the bar 164. The under groove 165 is parallel to the axis of the bearing plates 35 and 56. The electrical conductors 104 and 105, leading respectively from the pickup units in the carriages 137 and 136, are of sufficient length to permit shifting of the carriages along the bar 132 without restraint of those conductors.

OPERATION

*Electrical nullification of reactive effect*

Assuming the balancer to be set up in general as described above in reference to Figs. 1–12, with the selector circuit of Fig. 14, the right and left-hand vibration pickup carriages are properly adjusted along the bars 15 and 16 to have their respective bearing plates 35 and 56 positioned to receive the small motor armature 57, which is the part selected for describing a balancing operation in the present instance. The belt 58 is looped over the armature 57 and the armature shaft ends are placed across the bearing plates 35 and 56.

To supply the necessary difference in light reflecting ability at the exposed left-hand end of the armature 57, some marking of the armature may be required. In some instances there may be a limited section of the armature end which will reflect light while the other part will not. However, in most cases a tab of some material may be required to be secured to the armature or, more simply, a mark placed directly on the armature. In the present instance, assuming the armature color to be dark as opposed to white and of substantially non-reflecting characteristic, a white mark 109 is formed in any suitable manner, such as chalking or painting a band of white or aluminum paint across the end in a radial manner. Obviously the same result could be had by applying a sticker. The exact circumferential width of this mark is not critical but is preferably of substantial width ranging from ten to around thirty degrees, particularly where, as in the present example, the armature 57 is of the small fractional horsepower type.

The headstock 73 is fixed in position along the bars 15 and 16, the left-hand carriage being preferably in close proximity thereto. The exciter lamp 80 is adjusted longitudinally of its supporting tube 83 and the tube itself shifted and tilted to focus the beam of light from that lamp onto the left-hand armature end, the best adjustment being secured when the lamp is moved slightly closer to its lens 81 than when in the position to give the sharpest image of the lamp filament on the work. The projected filament image should form a radial line on the end surface of the armature 57, this adjustment to the radial position being secured by twisting axially the lamp 80. In one present form of the invention, the distance between the lens and the armature end is within the range of five to eight inches. The switch 107 is closed to set the motor 59 into operation, it being assumed that the belt 58 has been properly aligned to have it extend downwardly on both front and back sides of the armature 57 in vertical parallel alignment.

The motor 59 is preferably operated at speeds which will revolve the armature 57 at a speed well above resonance of the whole vibrating assembly. The natural period of vibration, or the resonance point, is generally low due to the laterally resilient bearing supports. Speeds above resonance are chosen on account of the fact that the angle indication (position to correct unbalance) becomes more stable and the amplitude of vibration due to unbalance is greater than at lower speeds. Fans should be balanced at their operating speeds whenever possible in order to correct for aero dynamic as well as mechanical unbalance.

When the rotating armature 57 is brought up to maximum speed, the unbalance of it will set up horizontally directed vibrations in the two laterally resilient spring supported bearings 35 and 56 which in turn will be reflected through the respective bearing block connected wires 40 and 70 to generate voltages by that transmitted vibration in each instance in the respective pickup units 44 and 72. The sensitivity of the two units must be equalized by adjusting the effective length of the right angle sections of the wires 40 and 70 which enter and are secured to the units.

The voltages separately generated by the imparted vibrations to these pickups are selectively applied through the left-right selector switch 94 to the vertical set of cathode ray control plates. The purpose of these pickup units is to change the mechanical vibration of the bearings into electrical pulsating voltage which will be of the same frequency and be proportional to the amount of mechanical unbalance.

The power line supply switch 93 is closed and this closed position will be indicated by illumination of the pilot lamp 99. Also the exciter lamp 80 will be energized. The beam of light emitted through the small lens 81 passes through the lens 82 and is so aligned and focused as to form a light band radially across the end of the armature 57. The light from this source reflected from the end of the generator as it rotates is focused through the larger lens 82 on the light sensitive member in the PE cell 79. Since the mark or band 109 has higher light reflecting ability than the remainder of the armature end, the voltage varied by the PE cell due to the light reflected from that limited area will be of an impulsive or fluctuating type, one fluctuation occurring for each revolution of the armature having a single marking.

While reference has been made to a specific form of mark 109, for special test, different shapes of marks may be employed in place of the radial line or band, depending upon the shape of the trace or the trace pattern to be visualized on the cathode ray screen. The band type of marking is most practical because of its simplicity and ease of application, and also because of the simplified trace pattern obtained on the cathode ray screen.

The volting varied by the PE cell 79 is amplified in the usual and well known manner as illustrated by the wiring diagram in Fig. 12, and this amplified impulsive voltage is applied to the horizontal set of the cathode ray tube plates. Now if proper electrical adjustments have been previously made in respect to location, intensity, and pattern, a trace will appear upon the screen of the tube 102 having the pattern as shown in Fig. 11, wherein a single vertical line appears accompanied by a short horizontal line. The vertical line or trace, being induced by the vibrator voltage applied to the vertical control plates, indicates the amount of unbalance in the correctional plane near that bearing for which pickup unit the left-right switch 94 is thrown. The horizontal line is that part of the trace induced by the PE cell voltage resulting from the rotating mark 109.

The right-left selector switch 94 is employed to electrically select and permit reading the amount of vibration of either the left or the right end of the armature 57. To cancel the reactive effect of the unbalance, the two voltages from the pickup units 44 and 72 are added algebraically. Assuming that the armature 57 is balanced at the left end and unbalanced at the right end, the pickup unit 44 will receive vibration directly caused by displacement from the normal axis of rotation due to the unbalance of that right end. The other pickup 72 will receive vibration due solely to the reactive displacement of the armature 57. The A. C. voltages produced by these two pickups 44 and 72 are usually 180 degrees out of phase or of opposite, instantaneous polarity, thus allowing their being added in various proportions.

The potentiometers 115 and 116 in this circuit are controlled respectively by the dials 95 and 96. By varying the effective resistances across the pickup units 44 and 72 through manipulation of the dials 95 and 96, the voltages from the two vibration pickups 72 and 44 may be added algebraically to permit the balancer to indicate unbalance in any two predetermined correction planes. That is, by placing the output voltage of the one pickup unit against that of the other in varying amounts as determined by the settings of the resistances 115 and 116, a balance or comparison is had whereby the reactive pickup voltage is cancelled out and not indicated on the cathode ray tube screen. By use of the potentiometer circuit, as indicated in Fig. 14, either end of the armature 57 may be balanced first.

In practice, it is preferable to take a specimen part similar to the production part to be balanced, and this specimen should have some provision for making weight adjustments in each of the selected diametrical correction planes. The specimen part then is placed on the bearing plates 35 and 56 with the belt 58 passed thereover and the weights so adjusted by repeated running trails that the specimen will be in substantial running balance, such as when there is substantially no vertical trace line on the screen of the tube 102 for each pickup unit, this balance being obtained even though the potentiometers 115 and 116 may not be properly adjusted.

Then, a known weight (not shown) is added (or substracted) in one correction plane, say the left plane. The right-left selector switch 94 is thrown to the right to apply the voltage from the pickup unit 44, plus that portion of the voltage of pickup 72 as apportioned by setting of potentiometer 115, to the cathode ray tube vertical control plates. The left-hand dial 95 (potentiometer 115) is adjusted to produce the shortest possible vertical height of the trace line on the screen of the tube 102, thus showing cancellation of the reactive effect of the unbalance weight from the opposite end. The left-hand correction plane is restored to balance by removing that added weight (or adding if initially subtracted), and a known weight is added (or substracted) in the right-hand plane of correction.

Now, the selector switch 94 is thrown to the left to apply the pickup unit 72 voltage, plus that part of the voltage of the pickup unit 44 as apportioned by the setting of the potentiometer 116, to the tube vertical control plates and the dial 96 (potentiometer 116) adjusted to bring the height of the vertical trace on the tube screen to a minimum. The two dials 95 and 96 are then held in those respective positions, preferably by some locking means, such as the respective screws 117 and 118 having their heads carried against the dials.

The vertical gain control 121 is adjusted through the socket 97, Fig. 1, by a suitable removable plug or key (not shown) to cause the vertical height of the trace on the cathode ray tube screen to be somewhat less than the full scale height. The horizontal gain control 122 is adjusted through the socket 98, Fig. 1, until the horizontal peak on the trace may be easily identified, such as about one-eighth inch in horizontal length. This peak is the one which is caused by the change in reflected light reaching the PE cell as the marked scanning surface of the armature 57 rotates through the light beam. Turning the handwheel 89 will cause the peak of the trace to move up or down the full length of the vertical trace. The balancer is adjusted in such manner that when the peak is at the top of the trace line, the light side of the part being balanced will be on the top thereof opposite the heavy side position above referred to. To adjust the vibration input voltage sensitivity, a variable resistance 123, Fig. 12, is employed and to adjust the PE cell impulse voltage sensitivity the variable resistance 124 is provided.

From the specimen piece run, the following conditions are made known for production running, namely, the maximum height of the trace or line on the scale of the cathode ray tube indicates an amount of unbalance equal to the weight of the test weight added or removed from the specimen part; only the amount of unbalance in the left correction plane is to be read on the screen with the selector switch 94 in the left-hand position; and only the amount of unbalance in the right correction plane is to be read on the screen with the selector switch 94 in the right-hand position.

It is necessary to determine the circumferential or angle position in each correction plane of the part to be checked where the weight is to be added or subtracted. With the same specimen piece, the piece is again rotated with the selector switch 94 closed to cause the vertical trace for that position to appear on the tube screen at its maximum length, assuming that a weight has been added in the correction plane of the piece to produce a known heavy spot location. The balancer is started, and the right-left selector switch 94 is shifted properly to read the unbalance. The horizontal line or impulse peak of the trace is shifted to the very bottom of the vertical trace line by turning the handwheel 89. The handwheel 89 is left in that position and the specimen piece is brought to a stop in the position where the mark 109 on its end is centered on the filament image thereon of the exciter lamp 80. The position taken by the known heavy spot is the correct position for removing weight to correct the unbalanced condition. The number of degrees read upon the drum 90 between the handwheel position and the known spot of heavy weight determines the location of that spot for removal of weight to correct the unbalanced condition. To permit this reading to be taken directly from zero, the handwheel 89 may be adjusted on its shaft 76 by loosening the screw 120 and shifting the wheel to have the zero position of the drum at the indicator 91 and then tightening the screw, whereupon rotation of the handwheel 89 to the known heavy spot will give directly the angular distance in degrees.

To locate the angular position of the "light weight" spot, advantage is taken of the fact that by rotating the handwheel to rotate the light beam, the horizontal trace line on the screen is brought to the top of the vertical trace line where zero phase displacement is indicated between the vibration induced voltage and the PE cell voltage output. With the horizontal screen line so shifted, the spot for balance correction always occurs at the same position (relative to the machine) on the specimen piece and will be on the top forward side of the piece where the spot is visible and accessible to the operator, and weight would be added at this spot. An indicator pointer (not shown) may be used to point to this exact spot for reference. Weight could be subtracted from the opposite 180 degrees removed point whichever is more mechanically expedient in production, and a 180 degrees shift in phase relation, as indicated by the trace on the cathode ray tube screen, allows the operator an instantaneous choice of either method of correction by adding or substracting weight without further manipulation of the balancer. It is to be noted that by use of the horizontal line position shifted to the end position of the vertical trace, possibility is eliminated of 180 degrees, or light-side heavy-side, error in judgment of the operator.

Now going back to the production run on the armature 57, and assuming that the balancer has been set up and adjusted by the use of the specimen piece, the height of the vertical line on the cahode ray tube screen for either end vibration pickup unit will indicate the amount of unbalance in the particular correction plane in proportion to the original specimen weight employed. That is, if the vertical trace line is one-half the length of the line set up by the specimen weight, then the unbalanced condition requires one-half of that weight for correction. Specifically, the routine steps to be followed in balancing the piece 57 would be as follows. Start the balancer to have the piece 57 rotating; throw the switch 94 to the left; adjust the handwheel 89 to bring the horizontal line to the top of the vertical trace line on the tube screen; and record the height of the vertical trace in reference to the screen scale and also record the angle reading on the handwheel drum 90. Throw the selector switch to the right and adjust the handwheel until the horizontal trace line is again at the top of the vertical trace; record the scale height of the vertical trace, and the drum reading of the handwheel—leave the handwheel set for the first correction operation (right end). Stop the piece 57 to have the mark 109 centered on the spot of light; and mark the right end of the piece 57 with a figure indicating the relative amount of unbalance, placing this mark at the point of correction. Shift the handwheel 89 back to the recorded angle for the left-hand position; line up the mark 109 with the spot of light; and mark the left-hand end of the piece 57 with a figure representing the relative amount of unbalance at the correction point. Then finally remove the piece 57 from the balancer, and make the corrections indicated by the required addition or subtraction of weight, such as by soldering, drilling, or the like, as the practice may be selected.

Due to sensitivity of the pickup units 44 and 72 to lateral vibration, it is preferable to locate the balancer on the ground floor to have the balancer bench supported directly on concrete and as remote as possible from heavy running machinery if extraneous vibration cannot be avoided, the balacer frame should be isolated by mounting it on springs or vibration damping medium.

Nullification of reactive effect by mechanical restraint

When the balancer is set up in accordance with the diagram of Fig. 23, in place of cancelling out the reactive effect at one end of the armature due to the unbalance condition at the other end, the vibration bar 7 is simply pivotally secured first at E if the unbalance is in the zone D, and the right-left selector switch 94 shifted to the left to apply the vibration induced voltage through the pickup unit 72 through the amplifier to the cathode ray tube 102. The point F is left free to travel in an arc, the center of which is the pivot position E. Conversely the vibration bar 7 is pivoted at F and left free at E when the unbalance being checked is in the zone C. It is to be remembered that these pivot points, as above indicated, are in balance through the respective zones C and D normal to the axis of the armature 57.

The actual detection of the unbalance and the location thereof in reference to the armature 57 is obtained by the same procedure as outlined above in operating the balancer in conjunction with the electrical nullification of the reactive effect.

Nullification of reactive effect by shifting of pickup units

The rather unique setup of the shiftable pickup units, as illustrated in Figs. 16-21 inclusive, gives excellent results in the balancing of the rotative part. As above indicated, the scanning system remains the same. Referring to Fig. 16, the pickup unit carriage 137 is secured in position on the bar 132 to have its operating wire 146 contacting the vibrator bar 164 in the plane of correction for unbalance at the left-hand end of the armature 57. Now to cancel out the reactive effect of this unbalance of the left portion of the armature, the pickup carriage 136 is shifted along the bar 132 until its operating wire 144 reaches a point therealong which is in the plane of the node as will be indicated by the vertical trace on the cathode ray tube screen growing shorter as the carriage is shifted, and then longer as the "trolley" wire 144 passes through that position. The node is located when the wire 144 is at that point along the vibrator bar 164 wherein there is no vertical height to the trace, this being the point of zero signal. It is understood, of course, that the selector switch 94 will be shifted to permit the output of the left-hand pickup unit 72 to be applied through the amplifier to the cathode ray tube 102 to obtain this setting. Once that setting is obtained, the carriage 136 is secured in position on the bar 132 by means of the thumb screws 138. Thus the balancer may be set up so as to be unresponsive in one correction plane to changes in the distribution of mass in the opposite correction plane. The degree and location of the unbalance spot in the right-hand correction plane of the armature 57 will then be obtained in the manner as above set forth in the description of the use of the balancer in conjunction with the potentiometer circuit.

To obtain balancing at the other end of the armature 57, the carriage 136 would be shifted to bring its "trolley" wire 144 back to the position within the plane of correction through the right-hand end of the armature and the carriage secured in that position. Then the right-hand carriage 137 would be shifted until its "trolley" wire 146 reaches the nodal position along the vibrator bar 164. Referring to Fig. 15 showing the electrical circuit for the pickup units in this particular form of the selector system, the variable resistances 167 across the output of the pickup unit 72 and the resistance 168 across the output of the pickup unit 44 will be respectively controlled by the dials 95 and 96 for relative adjustments of the pickup units outputs. The terminals A and B of this selector circuit will correspond to the terminals A and B in the diagram in Fig. 12.

It is therefore to be seen that by this unique structure permitting the location of one pickup unit in a desired correction plane and the other pickup unit at a nodal point, advantage is taken of the inherent characteristic of a revolving member of some length which produces the effect shown in Fig. 22.

CONCLUSION

By use of the invention employing any one of the three types of nullifying or cancelling out the reactive effect of unbalance, a rotatable member may be equally checked for both the amount and location of the unbalance in either one or both of two arbitrarily selected, spaced apart correction planes. No mechanical coupling of the rotating part with any type of an electric generator is required. No scale is applied to the rotatable member. While the invention has above been described in particular detail, it is obvious that mechanical changes in design and variations in electrical elements and circuits may be employed without departing from the spirit of the invention and it is therefore intended that the invention be not limited to that precise description any more than may be required by the following claims.

I claim:

1. In a dynamic balancer, a light scanning head comprising a relatively fixed support; a rotatable shaft journaled in the support; a lamp; a lamp support carried by said shaft; a photoelectric cell carried by said shaft; and a lens system also carried by the shaft; said system being formed to focus a beam of light from said lamp on a rotatable piece to be balanced and also to concentrate light reflected from said piece on said cell.

2. In a dynamic balancer, a light scanning head comprising a relatively fixed support; a rotatable shaft journaled in the support; a lamp; a lamp support carried by said shaft; a photoelectric cell carried by said shaft; and a lens system also carried by the shaft; said system being formed to focus a beam of light from said lamp on a rotatable piece to be balanced and also to concentrate light reflected from said piece on said cell; said system including a lamp focusing lens, and a larger condensing lens through which said beam travels to said piece and back through which said reflected light travels, the optical axes of the lenses being common.

3. In a dynamic balancer, a light scanning head comprising a relatively fixed support; a rotatable member journaled in the support; a lamp; a lamp support carried by said member; a photoelectric cell carried by said member; and a lens system also carried by the member; said system being formed to focus a beam of light from said lamp on a rotatable piece to be balanced and also to concentrate light reflected from said piece on said cell, said lamp being carried by said member to permit the incidence of said beam on said piece to be disposed from the axis of rotation of said piece; means for revolving said member to revolve said beam about said axis; and means to measure the degree of revolution of the beam.

4. In a dynamic balancer, a light scanning head comprising a relatively fixed support; a rotatable member journaled in the support; a lamp; a lamp support carried by said member; a photoelectric cell carried by said member; and a lens system also carried by the member; said system being formed to focus a beam of light from said lamp on a rotatable piece to be balanced and also to concentrate light reflected from said piece on said cell, said lamp being carried by said member to permit the incidence of said beam on said piece to be disposed from the axis of rotation of said piece; means for revolving said member to revolve said beam about said axis and measure the degree of revolution of the beam; said fixed support having a window, an opaque disc across said window and revolvable with said member, said disc having an aperture therethrough centered eccentric of the axis of said member, and said lens system being mounted axially of said aperture.

5. A dynamic balancer comprising in combination, a base; a pair of substantially rigid carriages carried by the base; a bearing member resiliently carried by each of said carriages to permit vibration in relation thereto; an electric generator fixed to each carriage; a substantially inertia-less member fixed to each of said bearing members and connecting with the generator of the respective carriage; a scanning head carried by said base, said head and the carriage adjacent thereto being relatively shiftable in relation to each other along said base; said head comprising a member rotatable on the extended axis of said bearing members, a light source carried by the rotatable member, means for directing a beam from said source toward said carriages to trace a circumferential path around said axis upon rotation of said rotatable member, a photo-electric cell carried by said rotatable member and positioned to receive said beam as may be reflected from a body mounted on said bearing members; a cathode ray tube oscillograph; an outside source of voltage applied to said photo-electric cell; and circuits between said generators, said photo-electric cell, and said oscillograph separately applying the generator voltages to one set of oscillograph beam control means, and the voltage varied by said photo-eelctric cell to another set of oscillagraph beam control means.

6. A dynamic balancer comprising in combinaion, a base; a pair of substantially rigid carriage carried by the base; a bearing member resiliently carried by each of said carriages to permit vibration in relation thereto; an electric generator fixed to each carriage; a substantially inertia-less member fixed to each of said bearing members and connecting with the generator of the respective carriage; a scanning head carried by said base, said head and the carriage adjacent thereto being relatively shiftable in relation to each other along said base; said head comprising a member rotatable on the extended axis of said bearing members, a light source carried by the rotatable member, means for directing a beam from said source toward said carriage to trace a circumferential path around said axis upon rotation of said rotatable member, a photo-electric cell carried by said rotatable member and positioned to receive said beam as may be reflected from a body mounted on said bearing members; a cathode ray tube oscillograph; an outside source of voltage applied to said photo-electric cell; and circuits between said generators, said photo-electric cell, and said oscillograph separately applying the generator voltages to one set of oscillograph beam control means, and the voltage varied by said photo-electric cell to another set of oscillograph beam control means; and means for damping vibration of said bearing members comprising in each instance a member carried by said carriage and yieldingly, frictionally bearing against said bearing member.

7. A dynamic balancer comprising in combination, a base; a pair of substantially rigid carriages mounted on the base; a bearing member resiliently carried by each of said carriages to permit lateral vibration in relation thereto; electric generator means fixed to each of said carriages; a wire-like rod fixed to each of said bearing members and extended across and connected with the respective generator; a control head mounted on said base; a member revolubly carried by said head to turn on an axis in common with the axis of said bearing members; a lamp carried by said revoluble member; means turning with said revoluble member to focus a beam of light from said lamp toward said carriages at a radial distance from said axis; a fixed housing about said head; a photo-electric cell carried by said revoluble member within said housing exposed only to light reflected from an object impinged by said beam; means externally of said housing to revolve said lamp; a cathode ray tube oscillograph having two sets of beam direction controls; a circuit between said generators and one of said sets of beam controls applying the voltage outputs thereto; a source of voltage applied to said photo-electric cell; and a circuit applying the voltage varied by said cell to the other of said beam control sets independently of said generator voltage outputs.

8. In a dynamic balancer for checking balance of a rotatable piece, said piece having a surface divided into sections of non-uniform light reflecting characteristics, a light scanning head comprising a relatively fixed support; a rotatable member carried by the support; a light source unit eccentrically mounted on said member to direct a light beam towards said surface to illuminate a limited area only thereof; and a photoelectric cell unit carried by said member to receive a reflection of said beam from said surface at any revolved position of said piece.

ROBERT B. ANNIS.